US009626268B2

(12) United States Patent
Blake et al.

(10) Patent No.: US 9,626,268 B2
(45) Date of Patent: Apr. 18, 2017

(54) CONTROLLING A BYTE CODE TRANSFORMER ON DETECTION OF COMPLETION OF AN ASYNCHRONOUS COMMAND

(71) Applicant: INTERNATIONAL BUSINESS MACHINES CORPORATION, Armonk, NY (US)

(72) Inventors: Thomas A. Blake, Hampshire (GB); Daniele M. Quadrozzi, Kent (GB); Martin A. Ross, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/864,147

(22) Filed: Sep. 24, 2015

(65) Prior Publication Data
US 2016/0092332 A1 Mar. 31, 2016

(30) Foreign Application Priority Data
Sep. 25, 2014 (GB) .................................. 1416892.6

(51) Int. Cl.
G06F 9/44 (2006.01)
G06F 11/273 (2006.01)
(Continued)

(52) U.S. Cl.
CPC ............ G06F 11/2736 (2013.01); G06F 8/52 (2013.01); G06F 9/44589 (2013.01);
(Continued)

(58) Field of Classification Search
CPC ..... G06F 11/3688; G06F 9/44589; G06F 8/52
(Continued)

(56) References Cited

U.S. PATENT DOCUMENTS 7,367,025 B1 4/2008 Nikolov et al.
7,895,580 B1 2/2011 Nikolov
(Continued)

OTHER PUBLICATIONS

Truyen et al., "Byte code Transformations for Distributed Threads in Java", 2000.*
(Continued)

*Primary Examiner* — Phillip H Nguyen
(74) *Attorney, Agent, or Firm* — Stephen Yoder, Esq.; Matthew M. Hulihan, Esq.; Heslin Rothenberg Farley & Mesiti, PC

(57) ABSTRACT

Controlling a byte code transformer on detection of completion of an asynchronous command. An asynchronous command is received by an asynchronous manager from a test framework. The asynchronous command manager issues the asynchronous command to an application. A transformer is loaded for transforming byte code associated with the application in order to output one or more method names and associated timestamps of one or more method entry points and one or more method exit points. A check is made as to whether an expected result has been generated by the application. In response to determining that an expected result has been successfully generated, a time period associated with successful generation of the expected result is compared with the timestamps in order to determine matching timestamps and associated matching method names. The transformer is modified in accordance with the matching method names such that a subsequent transformation executes on byte code associated with the matching method names.

20 Claims, 14 Drawing Sheets

(51) Int. Cl.
    *G06F 11/263*     (2006.01)
    *G06F 11/22*     (2006.01)
    *G06F 11/30*     (2006.01)
    *G06F 9/445*     (2006.01)
    *G06F 9/45*     (2006.01)
    *G06F 11/36*     (2006.01)
    *G06F 9/455*     (2006.01)

(52) U.S. Cl.
    CPC ...... *G06F 9/45516* (2013.01); *G06F 11/2221* (2013.01); *G06F 11/2635* (2013.01); *G06F 11/3006* (2013.01); *G06F 11/3688* (2013.01)

(58) Field of Classification Search
    USPC .......................................... 717/118, 124, 136
    See application file for complete search history.

(56) References Cited

U.S. PATENT DOCUMENTS

| | | |
|---|---|---|
| 8,381,192 B1 | 2/2013 | Drewery et al. |
| 8,533,687 B1 | 9/2013 | Greifeneder et al. |
| 8,566,800 B2 | 10/2013 | Gagliardi |
| 9,122,804 B2* | 9/2015 | Rhoads |
| 2003/0163608 A1* | 8/2003 | Tiwary ................ G06F 11/3414 710/1 |
| 2004/0015600 A1* | 1/2004 | Tiwary ................ G06F 11/3414 709/234 |
| 2005/0039171 A1* | 2/2005 | Avakian .............. G06F 11/3495 717/127 |
| 2005/0039190 A1* | 2/2005 | Rees .................. G06F 11/3419 719/316 |
| 2008/0127072 A1* | 5/2008 | Mathiske ............ G06F 11/3688 717/118 |
| 2010/0138703 A1* | 6/2010 | Bansal ................ G06F 11/3495 714/57 |
| 2013/0185643 A1* | 7/2013 | Greifeneder ............ H04L 67/22 715/736 |

OTHER PUBLICATIONS

Li, Zhen-Dong et al., "Bytecode-based Software Monitoring and Trusted Evolution Programming Framework," IEEE Symposium on Robotics and Applications, Jun. 2012, pp. 494-497.

Binder, Walter et al., "Reengineering Standard Java Runtime Systems Through Dynamic Bytecode Instrumentation," Seventh IEEE International Working Conference on Source Code Analysis and Manipulation, Sep. 2007, pp. 91-100.

* cited by examiner

```
public class MyAgent { public static void premain(String agentArgs, Instrumentation inst) {
        inst.addTransformer(new MyTransformer(agentArgs));
    }
} public class MyTransformer implements ClassFileTransformer { private boolean trainingSystem = false;

public MyTransformer(String args) {
        if (args.equals("trainingSystem") {
            this.trainingSystem = true;
        }

} public byte[] transform(ClassLoader loader, String className, Class classBeingRedefined,
ProtectionDomain protectionDomain, byte[] classfileBuffer) throws IllegalClassFormatException { byte[] byteCode = classfileBuffer;

if (checkClass(className)) { try {   ClassPool cp = ClassPool.getDefault();
                            CtClass cc = cp.makeClass(new
ByteArrayInputStream(classfileBuffer));
                            CtMethod[] cmArray = cc.getDeclaredMethods();
                            for (CtMethod cm : cmArray) {
                                    if ( checkMethod(className, cm.getName() ) ) {
                                            cm.insertBefore("System.out.println(" +
cm.getName() + new java.util.Date());");
                                            cm.insertAfter("System.out.println(" +
cm.getName() + new java.util.Date());");
                                    }
                            }
```

FIGURE 5A

```
byteCode = cc.toBytecode();
                cc.detach();
        } catch (Exception ex) {
                ex.printStackTrace();
        }
    }
    return byteCode;
} private Boolean checkClass(String className) {
    if (trainingSystem) {
        return true;
    } else if (rationalisedClassesMap.getKeys().contains(className)) {
        return true;
    } else {
        return false;
    }

} private Boolean checkMethod(String className, String methodName) {
    if (trainingSystem) {
        return true;
    } else {
        List rationalisedMethodsList = rationalisedClassesMap.get(className);
        if (rationalisedMethodList.contains(methodName)) {
            return true;
        } else {
            return false;
        }
    }
  }
}
```

FIGURE 5B

```
methodA() entry
----- methodB() entry
----- methodB() exit
----- methodC() entry
---------- methodD() entry
-------------------- methodE() entry
-------------------- methodE() exit
---------- methodD() exit
---------- methodF() entry
-------------------- methodG() entry
-------------------- methodG() exit
-------------------- startApplication() entry
------------------------- loadResources() entry
------------------------------ locateResources() entry
------------------------------ locateResources() exit
------------------------------ verifyResources() entry
------------------------------ verifyResources() exit
------------------------- loadResources() exit
------------------------- initialiseApplication() entry
------------------------- initialiseApplication() exit
-------------------- startApplicaiton() exit
---------- methodF() exit
----- methodC() exit
methodA() exit
```

FIGURE 6A

```
10:00.00.01  methodA() entry
10:00.00.02  ----- methodB() entry
10:00.00.02  ----- methodB() exit
10:00.00.03  ----- methodC() entry
10:00.00.04  --------- methodD() entry
10:00.00.05  -------------------- methodE() entry
10:00.00.05  -------------------- methodE() exit
10:00.00.06  --------- methodD() exit
10:00.00.06  --------- methodF() entry
10:00.00.07  -------------------- methodG() entry
10:00.00.07  -------------------- methodG() exit
10:00.00.08  -------------------- startApplication() entry
10:00.00.10  ------------------------- loadResources() entry
10:00.00.10  ------------------------------ locateResources() entry
10:00.00.30  ------------------------------ locateResources() exit
10:00.00.30  ------------------------------ verifyResources() entry
10:00.00.80  ------------------------------ verifyResources() exit
10:00.00.90  ------------------------- loadResources() exit
10:00.01.00  ------------------------- initialiseApplication() entry
10:00.58.00  ------------------------- initialiseApplication() exit
10:00.58.50  -------------------- startApplicaiton() exit
10:00.59.60  --------- methodF() exit
10:00.59.70  ----- methodC() exit
10:00.60.00  methodA() exit
```

FIGURE 6B

```
10:00.58.00  ------------------------ initialiseApplication() exit
10:00.58.50  -------------------- startApplicaiton() exit
10:00.59.60  ---------- methodF() exit
10:00.59.70  ----- methodC() exit
10:00.60.00  methodA() exit
```

FIGURE 6C

10:00.52.00 ------------------------ initialiseApplication() exit
10:00.52.50 -------------------- startApplicaiton() exit
10:00.58.60 ---------- methodF() exit
10:00.58.70 ----- methodC() exit
10:00.60.00 methodA() exit

FIGURE 6D

10:00.58.60 ---------- methodF() exit
10:00.58.70 ----- methodC() exit
10:00.60.00 methodA() exit

FIGURE 6E

```
001        my $socket = IO::Socket::INET->new(PeerAddr =>
002    $target, PeerPort => $port, Proto => 'tcp');

003            if(!$socket) {
004                while (!$socket && ($seconds < $timeout)) {
005                    mess("Port $port not up after
006    $seconds seconds");
007                    sleep(2);
008                    $socket = IO::Socket::INET-
009    >new(PeerAddr => $target, PeerPort => $port, Proto => 'tcp');
010                    $seconds++;
011                }
012                if (!$socket) {
013                    mess("ERROR: Port $port never
014    became available in $seconds seconds");
015                    exit -1;
016                } else {
017                    mess("Port $port available");
018                }
019            } else {
020                mess("Port $port available");
021            }
```

FIGURE 7

CONTROLLING A BYTE CODE TRANSFORMER ON DETECTION OF COMPLETION OF AN ASYNCHRONOUS COMMAND

PRIOR FOREIGN APPLICATION

This application claims priority from United Kingdom (GB) patent application number 1416892.6, filed Sep. 25, 2014, which is hereby incorporated herein by reference in its entirety.

BACKGROUND

One or more aspects of the present invention relate to controlling a byte code transformer on detection of completion of an asynchronous command.

Processing of commands can occur synchronously or asynchronously. A synchronous command is considered to have achieved an expected result when the synchronous command finishes and returns to an operating system or some other initiator.

An asynchronous command (e.g., to start an application; to enable a setting; etc.) is a command that may not necessarily have achieved an expected result when control is returned to the operating system. A test framework associated with issuing an asynchronous command is responsible for checking whether the asynchronous command has achieved an expected result. In one example, the test framework invokes a checking routine which checks whether an expected result (e.g., opening of a port; generation of a file; generation of a log entry; etc.) associated with, e.g., whether an application has started, has occurred. The checking routine can set a return code for an outcome of the asynchronous command, wherein the return code is associated with success or failure of an asynchronous command. A command is considered to be asynchronous if an associated checking routine is provided by the test framework.

A system (100) for issuing asynchronous commands as is known in the prior art is shown in FIG. 1. The system (100) comprises an application (110) such as a messaging application, residing on a device (105), such as a server computer, and operable to communicate with a test framework (115). The test framework (115) is operable to issue one or more asynchronous commands to the application (110). In an example, the test framework (115) interacts with the application (110) in order to send the application (110) an asynchronous command e.g., "startapp <app_name>" which is operable to start a messaging application. Following issuing of the asynchronous command, the test framework (115) invokes a checking routine to check whether an expected result (e.g., that a messaging application has started) is achieved. If the expected result is achieved, the test framework (115) can initiate further operations associated with testing of the application (110) (e.g., sending one or more messages to the messaging application; determining whether the one or more messages have been processed successfully and in response to the one or more messages being processed successfully, stopping the messaging application). An example flow of the interactions between the application (110) and the test framework (115) is shown below:

1. Start messaging application
2. Determine whether messaging application has started
3. Send one or more messages to the messaging application
4. Determine whether the one or more messages have been processed successfully
5. Stop the messaging application There are a number of problems associated with known test frameworks. For example, a maximum wait time can be set by a user to control how long the operating system should wait before considering the asynchronous command to be in error. However, the maximum wait time associated with a checking routine is configured manually and can be difficult to estimate—if an administrator of the test framework estimates a maximum wait time of sixty seconds yet an expected result is achieved in twenty seconds, the checking routine wastes time while waiting for the remaining forty seconds. The sum of such wastage can become significant in large test suites and impact other running processes. In another example, the test framework can invoke a checking routine which frequently polls the application to determine whether an expected result has occurred. However, the polling frequency is configured manually and can also be difficult to estimate—if an administrator of the test framework estimates a polling frequency of two seconds, yet an expected result is achieved in sixty seconds, the checking routine wastes resources by polling continuously for the preceding fifty eight seconds.

SUMMARY

In accordance with an aspect of the present invention, a computer-implemented method of controlling a byte code transformer on detection of completion of an asynchronous command is provided. The method includes receiving, by an asynchronous command manager of a processor, an asynchronous command from a test framework; issuing, by the asynchronous command manager, the asynchronous command to an application; loading a transformer for transforming byte code associated with the application in order to output one or more method names and associated timestamps of one or more method entry points and one or more method exit points; checking whether an expected result has been generated by the application; based on determining that the expected result has been successfully generated, comparing a time period associated with successful generation of the expected result with the associated timestamps in order to determine matching timestamps and associated matching method names; and modifying the transformer in accordance with the matching method names such that a subsequent transformation executes on byte code associated with the matching method names.

In accordance with another aspect of the present invention, a computer system for controlling a byte code transformer on detection of completion of an asynchronous command is provided. The computer system includes a memory; and a processor in communication with the memory, wherein the computer system is configured to perform a method. The method includes receiving, by an asynchronous command manager, an asynchronous command from a test framework; issuing, by the asynchronous command manager, the asynchronous command to an application; loading a transformer for transforming byte code associated with the application in order to output one or more method names and associated timestamps of one or more method entry points and one or more method exit points; checking whether an expected result has been generated by the application; based on determining that the expected result has been successfully generated, comparing a time period associated with successful generation of the expected result with the associated timestamps in order to determine matching timestamps and associated matching method names; and modifying the transformer in accordance with the matching method names such that a subsequent transformation executes on byte code associated with the matching method names.

In accordance with yet another aspect of the present invention, a computer program product for controlling a byte code transformer on detection of completion of an asynchronous command is provided. The computer program product includes a computer readable storage medium readable by a processing circuit and storing instructions for execution by the processing circuit for performing a method. The method includes receiving, by an asynchronous command manager of a processor, an asynchronous command from a test framework; issuing, by the asynchronous command manager, the asynchronous command to an application; loading a transformer for transforming byte code associated with the application in order to output one or more method names and associated timestamps of one or more method entry points and one or more method exit points; checking whether the expected result has been generated by the application; based on determining that the expected result has been successfully generated, comparing a time period associated with successful generation of the expected result with the associated timestamps in order to determine matching timestamps and associated matching method names; and modifying the transformer in accordance with the matching method names such that a subsequent transformation executes on byte code associated with the matching method names.

BRIEF DESCRIPTION OF THE DRAWINGS

Aspects of the present invention are particularly pointed out and distinctly claimed in the concluding portion of the specification. Aspects of the present invention, both as to organization and method of operation, together with features and advantages thereof, may best be understood by reference to the following detailed description when read with the accompanying drawings.

Embodiments of the present invention will now be described, by way of example only, with reference to the following drawings in which:

FIGS. 5A-5B are a representation of program code associated with byte code instrumentation;

FIGS. 6A-6E are example representations of byte code;

FIG. 7 is one example of a representation of a checking routine; and

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of aspects of the invention. However, it will be understood by those skilled in the art that aspects of the present invention may be practiced without these specific details. In other instances, well-known methods, procedures, and components have not been described in detail so as not to obscure aspects of the present invention.

Aspects of the present invention provide a method and system for optimizing a test framework in order to simplify program code associated with the test framework and achieve performance gains.

Figure 1:
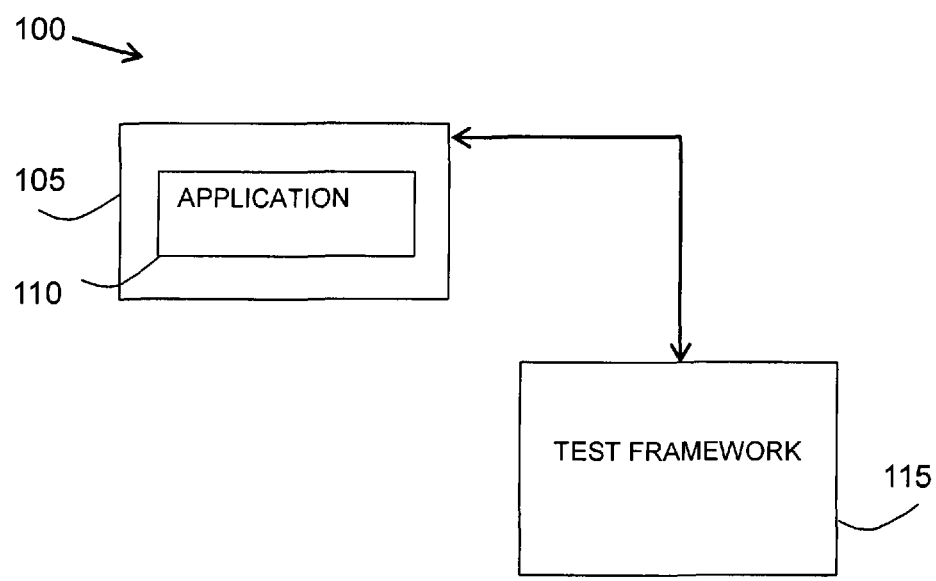
FIG. 1 is a block diagram of a system for issuing asynchronous commands.
Figure 2:
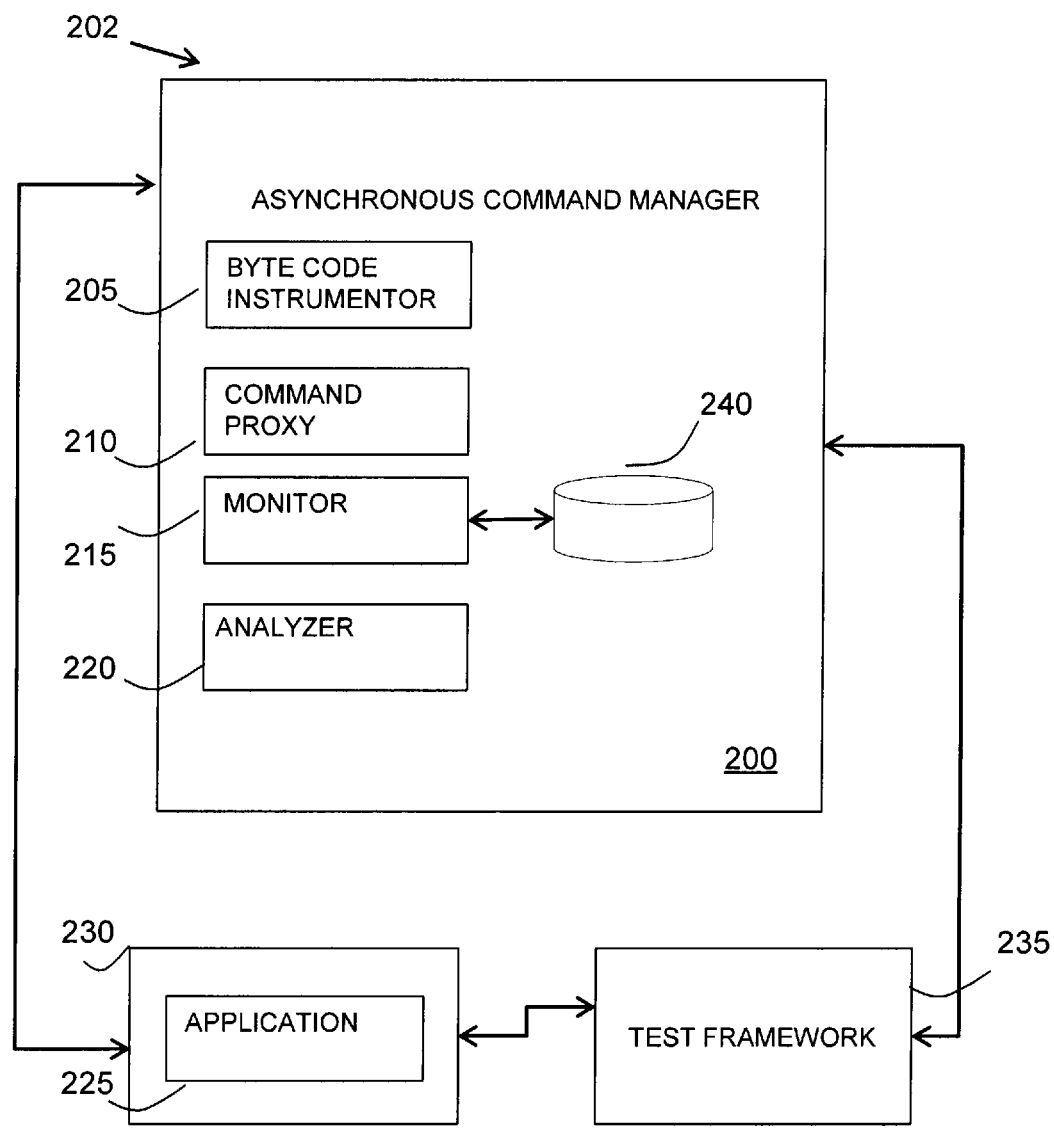
FIG. 2 is one example of a block diagram of a system for issuing asynchronous commands according to one embodiment.

A system (202) for issuing asynchronous commands according to one embodiment is shown in FIG. 2 and includes, for instance, an application (225), such as a messaging application, residing on a device (230), such as a server computer. The application (225) is operable to communicate with a test framework (235). The system (202) also includes an asynchronous command manager (200) having a byte code instrumentor (205); a command proxy (210); a monitor (215) operable to communicate with a data store (240); and an analyzer (220). The asynchronous command manager (200) is operable to communicate with the test framework (235) and the application (225). It should be understood that the asynchronous command manager (200) can be implemented in a number of ways—the asynchronous command manager (200) can be implemented as a stand-alone program that runs separately from the test framework (235) and the application (225) or can be implemented as a program (e.g., a plugin) that is included with one or more of the test framework (235) and the application (225).

As background, source code (in the example herein, written in the Java programming language (Java and all Java-based trademarks and logos are trademarks or registered trademarks of Oracle and/or its affiliates)) associated with an application is converted into byte code upon compilation; the byte code is interpreted into machine specific instructions which are executable. Byte code instrumentation is defined as the addition of byte codes to methods for the purpose of gathering data to be utilized by tools.

Figure 3A:
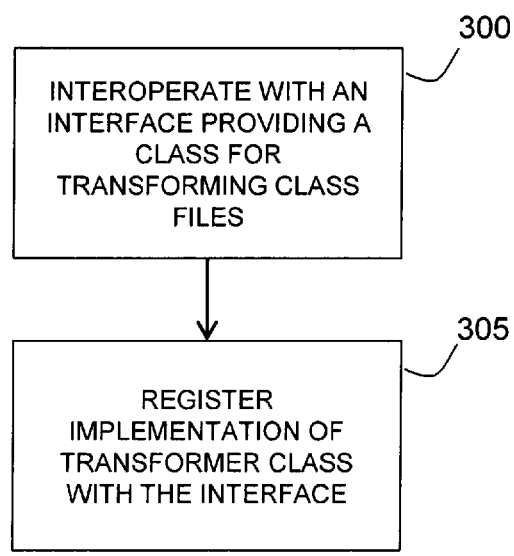
FIG. 3A is one example of a flow chart showing the operational steps involved in a first process of one embodiment.

One example of a flow chart showing the operational steps involved in a process of one embodiment is shown in FIG. 3A and will now be described below.

In an example, program code associated with byte code instrumentation is shown in FIGS. 5A-5B and will be described in further detail below.

In an example, byte code of the application (225) to be instrumented is shown in FIG. 6A—note that only method entry (e.g., methodName( ) entry) points and method exit (e.g., methodName( ) exit) points are shown for clarity.

In one implementation, the present invention uses a tool such as Javassist to instrument byte code.

Referring to FIG. 3A, the byte code instrumentor (205) interoperates (step 300) with an interface of a tool providing a class (e.g., ClassFileTransformer is one example) for transforming class files in order to generate and register (step 305) a transformer with the interface.

Referring to FIG. 5A, the byte code instrumentor (205) provides a class e.g., "MyAgent" to the Java Virtual Machine (JVM) (e.g., see "public class MyAgent {").

When the JVM has initialized the MyAgent class, it will be loaded by a system class loader and the interface will be instantiated. A "premain" method of the MyAgent class is subsequently invoked which registers (step 305) a transformer e.g., MyTransformer using an addTransformer method—e.g., see:

```
public static void premain(String agentArgs, Instrumentation inst) {
    inst.addTransformer(new MyTransformer(agentArgs));
```

Figure 3B:
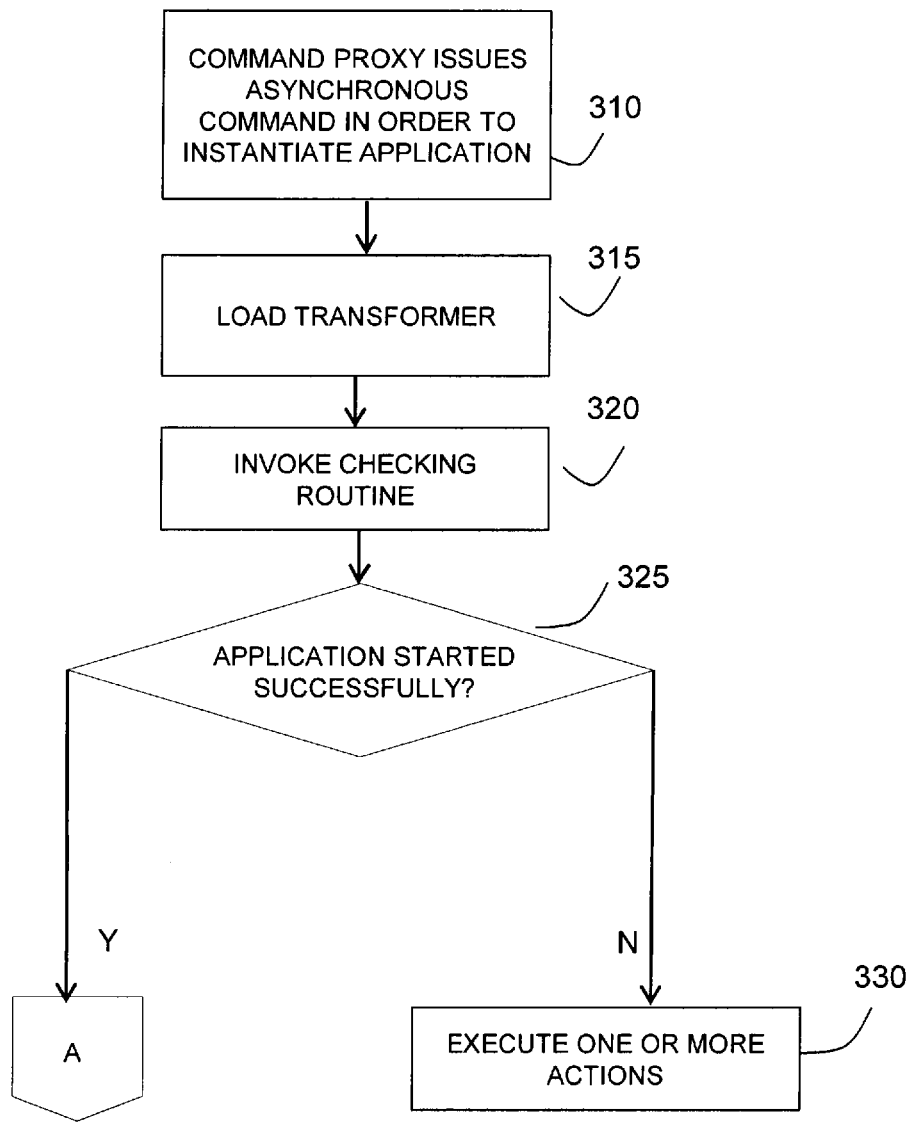
FIG. 3B is one example of a flow chart showing the operational steps involved in a second process of one embodiment.

One example of a flow chart showing the operational steps involved in a process for checking whether an expected result has been achieved from the application (225) is shown in FIG. 3B.

In a pre-processing step, the test framework (235) issues a command to start the application (225) to the command proxy (210) of the asynchronous command manager (200)—note that in the prior art, the test framework issues an asynchronous command to the application and is also responsible for checking whether an expected result has been achieved from the application. However, in one embodiment, the test framework (235) issues a synchronous command to the command proxy (210) as control is not returned to the test framework (235) until the asynchronous command manager (200) deems that an expected result has been achieved.

With reference to FIG. 3B, at step 310, the command proxy (210) forwards the following asynchronous command to the application (225):

Asynchronous command:

Call startApplication.exe

The byte code instrumentor (205) is operable to load (step 315) a transformer registered at step 305 into the JVM.

Any classes associated with the application (225) that are required are loaded and can be transformed if necessary. In one implementation, the transformer receives byte code associated with the application (225).

Note that step 315 of FIG. 3B ensures that for an asynchronous command to start an application, a transformer can be enabled. Alternatively, an asynchronous command can be made to an already running application such that the application responds back immediately notifying that the application will do work; however, the application will not complete the work before returning control to the framework—in this case, the transformer would have already been loaded, and thus, step 315 is an optional step as it may have already been executed. In general, the MyTransformer method is called whenever a class is loaded; however, byte code is only transformed when the following conditions return true, as will be described in more detail herein: "if (checkClass(className))" and "if (checkMethod (className, cm.getName( )))". Otherwise, unchanged byte code is returned—e.g., see "return byte code".

In one embodiment, the following method checks whether, e.g., the asynchronous command manager or an administrator wishes to implement a training routine in which each method of the byte code is instrumented such that a maximum amount of data can be gathered regarding successful start of the application. Otherwise, only methods associated with a set of mappings, namely, "rationalisedClassesMap", of "String" (className) to "List" (methodName), are instrumented:

```
private Boolean checkClass(String className) {
    if (trainingSystem) {
        return true;
    } else if (rationalisedClassesMap.getKeys( ).contains(className)) {
        return true;
    } else {
        return false;
    }
}
```

On first run through the process of FIG. 3B, in an example, a training routine is initiated and the mapping table is empty; thus, each method of byte code represented in FIG. 6A is instrumented.

For each class, associated method names are retrieved and an associated timestamp is output before and after the execution of each method:

```
try {    ClassPool cp = ClassPool.getDefault( );
            CtClass cc = cp.makeClass(new
ByteArrayInputStream(classfileBuffer));
            CtMethod[ ] cmArray = cc.getDeclaredMethods( );
            for (CtMethod cm : cmArray) {
                if ( checkMethod(className, cm.getName( ) ) ) {
                    cm.insertBefore("System.out.println(" +
cm.getName( ) + new java.util.Date( ));");
                    cm.insertAfter("System.out.println(" +
cm.getName( ) + new java.util.Date( ));");
                }
            }
```

A resulting representation of the method names and associated timestamps is output to, e.g., the data store (240), a representation of which is shown in FIG. 6B.

The monitor (215) executes (step 320) a checking routine in order to determine (step 325) whether an expected result has been achieved from the application (225).

In one implementation, the checking routine determines whether the application (225) has started successfully. An application may execute a number of processes before it starts successfully, for example, initializing; registering; configuring a number of components; initializing communication channels, etc. In one implementation of a checking routine as shown in FIG. 7, variables (e.g., $target, $port and $timeout) are denoted by the parameter "$". In one example, the variables are assigned values as shown below:

$target=localhost $port=1111

$timeout=60

In accordance with the above values, with reference to FIG. 7, following execution of the checking routine, while the current time in seconds is less than the timeout of sixty seconds (e.g., see line 004 "while (!$socket && ($seconds<$timeout))"), the checking routine checks port "1111" of target "localhost" every two seconds (e.g., see line 007 "sleep(2)") for 60 seconds.

In one embodiment, the checking routine is operable to log, in the data store (240), a time value associated with the start of each two second period and associate the time value with an entry indicating whether the port has become available as shown below:

First entries generated by the checking routine:

| Time value | Port available (T/F): |
|---|---|
| 10:00.00.00 | F |
| 10:00.02.00 | F |
| . | |
| . | |
| . | |
| 10:00.58:00 | F |
| 10:00.60:00 | T |

If, following expiry of the timeout, the checking routine determines that port "1111" did not become available (step 325), in one example, the checking routine generates a message notifying the user (e.g., see lines 013 and 014 "mess("ERROR: Port $port never became available in $seconds seconds")"). An error code is returned to the test framework (e.g., see line 015 "exit −1"), and in response, the test framework (235) is configurable to execute (step 330) one or more actions, e.g., the test framework (235) may exit or may issue a retry operation.

In the example herein, in accordance with the following entry "10:00.60:00; T", the checking routine determines that the port has become available (step 325). In one embodiment, an associated return code is issued to the test framework (235).

The monitor (215) instantiates the analyzer (220).

Figure 4:
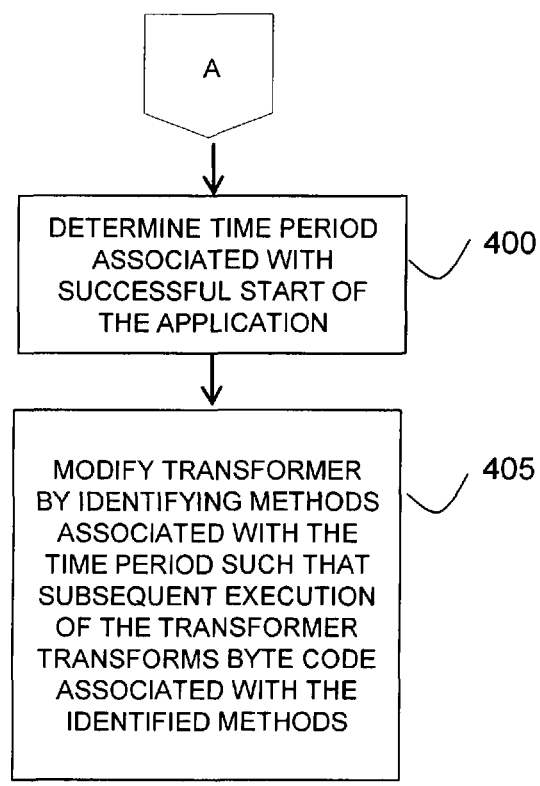
FIG. 4 is one example of a flow chart showing the operational steps involved in a third process of one embodiment.

With reference to FIG. 4, at step 400, the analyzer (220) determines a time period associated with successful start of the application (225) by analyzing the entries generated by the checking routine shown above. In one embodiment, the analyzer (220) is configured to parse the entries, sequentially, to find the first occurrence of an entry comprising "T" in the "Port available" column; store (e.g., in temporary memory) a first associated time value (e.g., "10:00.60:00")—such an entry denotes successful start of the application (225) but in practice, the application (225) may have started successfully at a time value within a time period denoted by a time value (e.g., "10:00.58:00") of the entry which immediately precedes the entry of "10:00.60:00; T" and the time value of "10:00.60:00". Thus, in one example, in order to determine a time period associated with successful start of the application (225), the analyzer (220) is operable to parse the entries generated by the checking routine shown above to find an immediately preceding entry to the first occurrence of an entry comprising "T" in the "Port available" column and store (e.g., in temporary memory) a second associated time value (e.g., "10:00.58.00"). In summary, it can be understood that the application (225) is to have started successfully at a time value within a time period denoted by the first and second time values ("10:00.58.00" to "10:00.60.00").

In response to determining the first and second time values, the analyzer (220) is operable to log a subset of the entries shown in FIG. 6B wherein each entry has a timestamp that falls within the time period denoted by the first and second time values ("10:00.58.00" to "10:00.60.00") by parsing each entry shown in FIG. 6B, sequentially, and comparing a timestamp of the parsed entry with the first (e.g., "10:00.60:00") and second (e.g., "10:00.58.00") time values; if the timestamp is more than or equal to the second time value and less than or equal to the first time value, the analyzer (220) stores the associated entry in the data store (240), a representation of which is depicted in FIG. 6C.

The analyzer (220) passes the method names associated with the entries depicted in FIG. 6C to the byte code instrumentor (205) which modifies (step 405) the operation of the transformer by configuring the "rationalisedClassesMap" to remove methods that no longer require instrumentation. The subsequent, modified operation of the transformer will be described in more detail below.

The asynchronous command manager or the administrator can make a decision as to whether to execute the process of FIG. 3B again and if so, whether to only instrument byte code associated with the methods in the "rationalisedClassesMap" or whether to implement further training by instrumenting each method associated with the byte code.

In the example herein, the process of FIG. 3B is re-executed wherein only byte code associated with the methods in the "rationalisedClassesMap" is instrumented.

With reference to FIG. 3B, the command proxy (210) forwards (step 310) an asynchronous command to the application (225) in order to start the application. The byte code instrumentor (205) is operable to load (step 315) the transformer registered at step 305 into the JVM. As stated above, in the example herein, only methods associated with "rationalisedClassesMap" are instrumented. Note the modified operation of the transformer: the methods to be instrumented are represented in FIG. 6C—note that the number of methods is significantly lower than the number of methods represented in FIG. 6A that were instrumented by the transformer on the first execution of FIG. 3B.

Associated method names are retrieved and an associated timestamp is output before and after the execution of each method—a resulting representation of the method names and associated timestamps is output to, e.g., the data store (240), a representation of which is shown in FIG. 6D.

Note that the entries of FIG. 6D have different timestamps from corresponding entries shown in FIG. 6B as in practice, the entry and exit method points may occur at different times due to operating constraints, such as memory availability and CPU usage of the environment.

The monitor (215) executes (step 320) the checking routine in order to determine (step 325) whether an expected result has been achieved from the application (225), and as before, the checking routine is operable to log, in the data store (240), a time value associated with the start of each two second period and associate the time value with an entry indicating whether the port has become available as shown below:

Second entries generated by the checking routine:

| Time value | Port available (T/F): |
|---|---|
| 10:00.00.00 | F |
| 10:00.02.00 | F |
| . | |
| . | |
| . | |
| 10:00.58:00 | F |
| 10:00.60:00 | T |

In the example herein, in accordance with the following entry "10:00.60:00; T", the checking routine determines that the port has become available (step 325). In one example, an associated return code is issued to the test framework (235).

The monitor (215) instantiates the analyzer (220).

As before, the analyzer (220) determines (step 400) a time period associated with successful start of the application (225) by analyzing the second entries generated by the checking routine shown above in order to determine a third associated time value (e.g., "10:00.60.00") and a fourth associated time value (e.g., "10:00.58.00").

As before, the analyzer (220) is operable to log a subset of the entries of FIG. 6D having a timestamp that falls within the time period denoted by the third and fourth time values by parsing each entry of FIG. 6D, sequentially, and comparing a timestamp of the parsed entry with the third and fourth time values; if the timestamp is more than or equal to the fourth time value and less than or equal to the third time value, the analyzer (220) stores the associated entry in the data store (240), a representation of which is depicted in FIG. 6E.

The analyzer (220) passes the method names associated with the entries depicted in FIG. 6E to the byte code instrumentor (205) which modifies (step 405) the operation of the transformer by configuring the "rationalisedClassesMap" to remove methods that no longer require instrumentation.

In one embodiment, the analyzer (220) calculates an intersection of the entries of FIG. 6C and FIG. 6E; that is, the analyzer parses each of the entries of FIG. 6C and FIG. 6E and compares the parsed output in order to determine matching entries. In the example herein, the intersection is shown below:
methodF( ) exit
methodC( ) exit
methodA( ) exit Note that the intersection provides a more accurate representation of methods associated with successful start of the application as the entries are associated with a time period associated with successful start of the application.

In one example, the asynchronous command manager (200) is also operable to modify the byte code of the methods in "rationalisedClassesMap" so that the byte code is operable to initiate calls to the asynchronous command manager (200) detailing progress and status rather than sending data to the data store that the asynchronous command manager (200) is to subsequently monitor.

Also, as already stated above, note that on re-execution of the process of FIG. 3B, a smaller subset of methods needs to be analyzed by the transformer compared with the first execution of the process of FIG. 3B. That is, optimization of the performance of the transformer can be advantageously achieved by using feedback gained from the analyzer. For example, the number of methods of FIG. 6A analyzed by the transformer on a first execution of the process of FIG. 3B is much larger than the number of methods of FIG. 6C analyzed on a second execution of the process of FIG. 3B—this produces a number of technical advantages associated with efficiency, for example, reducing the amount of processing undertaken by the transformer; controlling the transformer to analyze methods most likely to be associated with successful start of the application (225).

The asynchronous command manager (200) is able to achieve, for instance, more fine grained results associated with determining whether an asynchronous command has completed successfully by using a transformer which instruments the byte code of an application.

In one embodiment, wasteage associated with known checking routines can be optimized by using feedback from the entries generated by the checking routine. For example, the checking routine can be optimized—for example, after two executions of the process of FIG. 3B, it can be seen from the entries generated by the checking routine that success of the application occurs at a time value between fifty eight seconds and sixty seconds. Following analysis of the entries generated by the checking routine, the checking routine can be modified, e.g., by an administrator or by a set of rules to, e.g., wait fifty seconds before invoking a poll every two seconds. Again, such a feature has a technical advantage in terms of optimizing performance in that the more heavyweight process of polling can be delayed until a time value that is nearer to the known time values associated with success of the application. In practice, byte code can run to thousands of lines, and thus, such an optimization will have a large improvement on performance.

One or more aspects of the present invention have an architecture wide effect in that following modification of the transformer, a JVM is controlled to load the modified transformer on a re-execution of the process of FIG. 3B. The effect is universally applicable for any application running on the JVM instance.

In one embodiment, a data structure such as a call stack (which comprises method names and data associated with a hierarchy of called methods) with associated timestamp data is used to track a state of a method in a subsequent instantiation of the application in order to determine if the method has completed successfully or failed. In one embodiment, the timestamp data of a method entry and exit point is recorded and stored on multiple invocations of the application. In a further embodiment, such timestamp data is associated with a particular environment set-up as the environment can affect the length of time it takes for a method to enter and exit.

In one embodiment, the timestamp data for individual method entry and exit points are averaged in order to generate reference timestamp data that is associated with an expected time of entry and exit of the method. In one embodiment, minimum and maximum reference values associated with the timestamp data are also determined. The reference data is more accurate if generated in accordance with a larger number of invocations of the application.

One or more known statistical techniques can be deployed to calculate a probability associated with a state of a method in accordance with the reference timestamp data and current timestamp data.

If it is determined that a probability associated with failure of a particular method is high, in one example, one or more actions are invoked. For example, a wait period can be added to determine whether the method completes successfully within the wait period—if it is determined that the method is still executing but is executing more slowly than expected, in one embodiment, an adjustment to the reference timestamp data is made. If it is determined that the method has failed, one or more actions are invoked, e.g., an error return code is generated; the byte code associated with the method can be instrumented for closer analysis wherein events associated with success/failure of the method can be tracked using, e.g., textual analysis; ranking etc.

In one example, a call stack of each method in the application is generated. Alternatively, a call stack for a subset of the methods can be generated, e.g., every other method in the hierarchy; a number of methods (e.g., including child methods) that execute immediately prior to and subsequent to the known methods associated with the application completing successfully as well as the methods associated with the application completing successfully—the methods that execute immediately prior to and subsequent to the known methods associated with the application completing successfully may be more likely in contributing to success or failure of the application, and thus, progression of the application may be tracked more accurately by focusing on such methods as well as the known methods associated with the application completing successfully.

Figure 8:
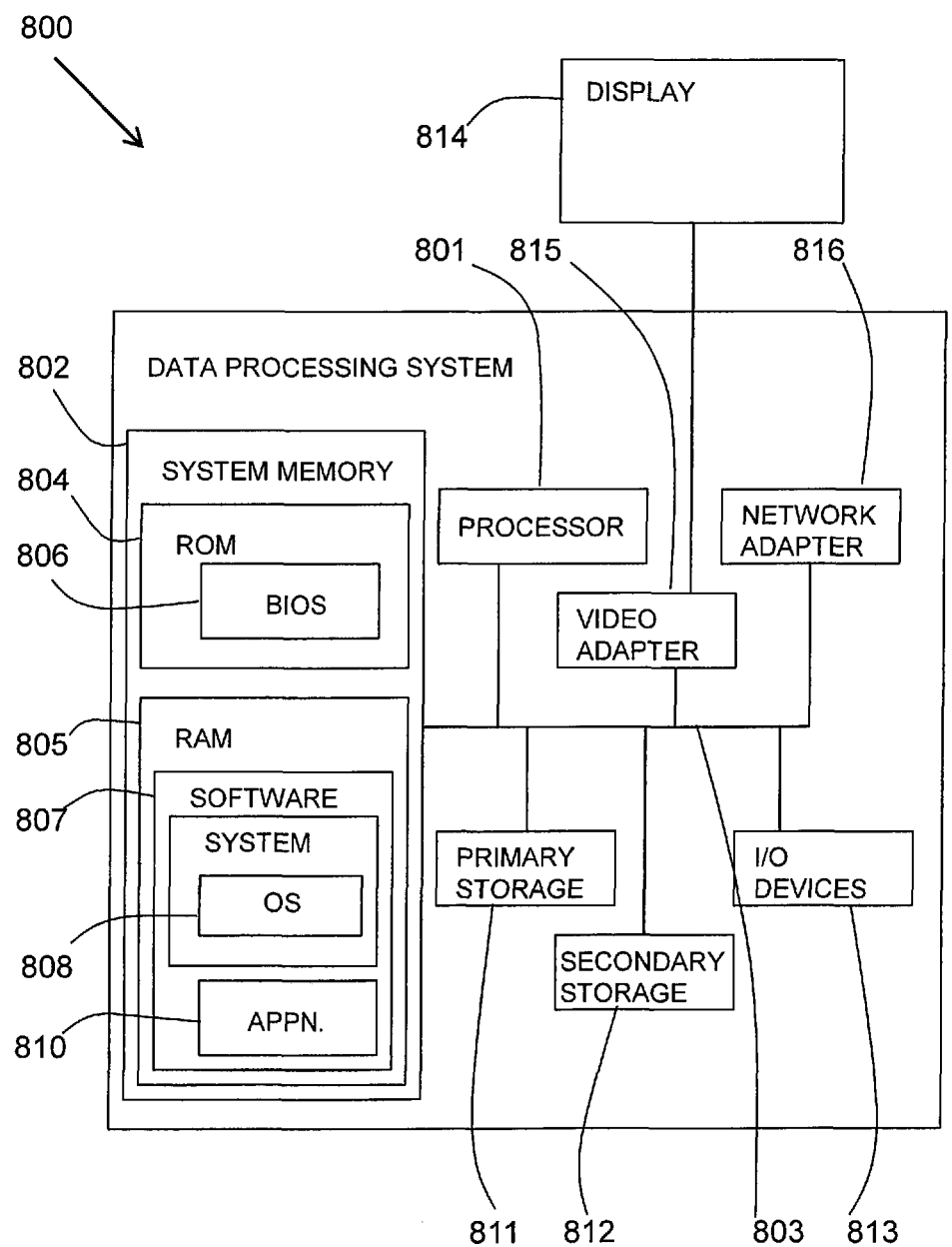
FIG. 8 is one example of a block diagram of a system for implementing aspects of one embodiment.

Referring to FIG. 8, one example of a system for implementing aspects of one embodiment includes a data processing system 800 suitable for storing and/or executing program code including at least one processor 801 coupled directly or indirectly to memory elements through a bus system 803. The memory elements may include local memory employed during actual execution of the program code, bulk storage, and cache memories which provide temporary storage of at least some program code in order to reduce the number of times code is to be retrieved from bulk storage during execution.

The memory elements may include system memory 802 in the form of read only memory (ROM) 804 and random access memory (RAM) 805. A basic input/output system (BIOS) 806 may be stored in ROM 804. System software 807 may be stored in RAM 805 including operating system software 808. Software applications 810 may also be stored in RAM 805.

The system 800 may also include a primary storage means 811 such as a magnetic hard disk drive and secondary storage means 812 such as a magnetic disc drive and an optical disc drive. The drives and their associated computer-readable media provide non-volatile storage of computer-executable instructions, data structures, program modules and other data for the system 800. Software applications may be stored on the primary and secondary storage means 811, 812 as well as the system memory 802.

The computing system 800 may operate in a networked environment using logical connections to one or more remote computers via a network adapter 816.

Input/output devices 813 may be coupled to the system either directly or through intervening I/O controllers. A user may enter commands and information into the system 800 through input devices, such as a keyboard, pointing device, or other input devices (for example, microphone, joy stick, game pad, satellite dish, scanner, or the like). Output devices may include speakers, printers, etc. A display device 814 is also connected to system bus 803 via an interface, such as video adapter 815.

As described herein, according to one aspect, there is provided a method for controlling a byte code transformer on detection of completion of an asynchronous command comprising the steps of: receiving, by an asynchronous command manager, an asynchronous command from a test framework; issuing, by the asynchronous command manager, the asynchronous command to an application; loading a transformer for transforming byte code associated with the application in order to output one or more method names and associated timestamps of one or more method entry points and one or more method exit points; checking, by a checking routine, whether an expected result has been generated by the application; in response to determining that an expected result has been successfully generated, comparing a time period associated with successful generation of the expected result with the timestamps in order to determine matching timestamps and associated matching method names; modifying the transformer in accordance with the matching method names such that a subsequent transformation executes on byte code associated with the matching method names.

According to another aspect, there is provided an apparatus for controlling a byte code transformer on detection of completion of an asynchronous command comprising: an asynchronous command manager for receiving an asynchronous command from a test framework; a command proxy for issuing the asynchronous command to an application; a byte code instrumentor for loading a transformer for transforming byte code associated with the application in order to output one or more method names and associated timestamps of one or more method entry points and one or more method exit points; a checking routine for checking whether an expected result has been generated by the application; an analyzer, responsive to a determination that an expected result has been successfully generated, for comparing a time period associated with successful generation of the expected result with the timestamps in order to determine matching timestamps and associated matching method names; wherein the byte code instrumentor is operable to modify the transformer in accordance with the matching method names such that a subsequent transformation is operable to execute on byte code associated with the matching method names.

According to yet another aspect, there is provided a computer program comprising computer program code stored on a computer readable medium to, when loaded into a computer system and executed thereon, cause said computer system to perform all the steps of a method above.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of aspects of the present invention.

What is claimed is:

1. A computer-implemented method of controlling a byte code transformer on detection of completion of an asynchronous command, the computer-implemented method comprising:
   receiving, by an asynchronous command manager of a processor, an asynchronous command from a test framework;
   issuing, by the asynchronous command manager, the asynchronous command to an application;
   loading a transformer for transforming byte code associated with the application in order to output method names and associated timestamps of method entry points of a plurality of methods and method exit points of the plurality of methods;
   checking whether an expected result has been generated by the application;
   based on determining that the expected result has been successfully generated, comparing a time period associated with successful generation of the expected result with the associated timestamps in order to determine matching timestamps and associated matching method names of a subset of methods of the plurality of methods, wherein methods of the subset of methods execute during at least a portion of the time period; and
   modifying the transformer in accordance with the matching method names such that a subsequent transformation executes on byte code associated with the matching method names of the subset of methods.

2. The computer-implemented method of claim 1, wherein the matching method names are associated with the time period of successful generation of the expected result.

3. The computer-implemented method of claim 1, wherein the asynchronous command is operable to initiate start of the application.

4. The computer-implemented method of claim 1, wherein the checking further comprises checking a state of one or more of: opening of a port, generation of a file, and generation of a log entry.

5. The computer-implemented method of claim 1, further comprising registering the transformer with an interface.

6. The computer-implemented method of claim 1, wherein the loading comprises loading the transformer based on a class associated with the application.

7. The computer-implemented method of claim 1, further comprising calculating an intersection of a plurality of sets of matching method names to increase an accuracy of identification of one or more matching method names associated with successful generation of the expected result.

8. The computer-implemented method of claim 1, further comprising based on determining that the expected result has not been successfully generated, executing one or more corrective actions.

9. The computer-implemented method of claim 1, further comprising optimizing the checking in accordance with the time period associated with successful generation of the expected result.

10. The computer-implemented method of claim 1, further comprising using a call stack in order to track a state of a method.

11. The computer-implemented method of claim 10, further comprising retaining method names that are not associated with the time period of successful generation of the expected result and are associated with the call stack.

12. A computer system for controlling a byte code transformer on detection of completion of an asynchronous command, the computer system comprising:
 a memory; and
 a processor in communication with the memory, wherein the computer system is configured to perform a method, said method comprising:
  receiving, by an asynchronous command manager, an asynchronous command from a test framework;
  issuing, by the asynchronous command manager, the asynchronous command to an application;
  loading a transformer for transforming byte code associated with the application in order to output method names and associated timestamps of method entry points of a plurality of methods and method exit points of the plurality of methods;
  checking whether an expected result has been generated by the application;
  based on determining that the expected result has been successfully generated, comparing a time period associated with successful generation of the expected result with the associated timestamps in order to determine matching timestamps and associated matching method names of a subset of methods of the plurality of methods, wherein methods of the subset of methods execute during at least a portion of the time period; and
  modifying the transformer in accordance with the matching method names such that a subsequent transformation executes on byte code associated with the matching method names of the subset of methods.

13. The computer system of claim 12, wherein the matching method names are associated with the time period of successful generation of the expected result.

14. The computer system of claim 12, wherein the loading comprises loading the transformer based on a class associated with the application being loaded.

15. The computer system of claim 12, wherein the method further comprises calculating an intersection of a plurality of sets of matching method names to increase an accuracy of identification of one or more matching method names associated with successful generation of the expected result.

16. A computer program product for controlling a byte code transformer on detection of completion of an asynchronous command, the computer program product comprising:
 a computer readable storage medium readable by a processing circuit and storing instructions for execution by the processing circuit for performing a method comprising:
  receiving, by an asynchronous command manager of a processor, an asynchronous command from a test framework;
  issuing, by the asynchronous command manager, the asynchronous command to an application;
  loading a transformer for transforming byte code associated with the application in order to output method names and associated timestamps of method entry points of a plurality of methods and method exit points of the plurality of methods;
  checking whether an expected result has been generated by the application;
  based on determining that the expected result has been successfully generated, comparing a time period associated with successful generation of the expected result with the associated timestamps in order to determine matching timestamps and associated matching method names of a subset of methods of the plurality of methods, wherein methods of the subset of methods execute during at least a portion of the time period; and
  modifying the transformer in accordance with the matching method names such that a subsequent transformation executes on byte code associated with the matching method names of the subset of methods.

17. The computer program product of claim 16, wherein the matching method names are associated with the time period of successful generation of the expected result.

18. The computer program product of claim 16, wherein the loading comprises loading the transformer based on a class associated with the application being loaded.

19. The computer program product of claim 16, wherein the method further comprises calculating an intersection of a plurality of sets of matching method names to increase an accuracy of identification of one or more matching method names associated with successful generation of the expected result.

20. The computer program product of claim 16, wherein the method further comprises based on determining that the expected result has not been successfully generated, executing one or more corrective actions.

* * * * *